(12) United States Patent
Kim (10) Patent No.: US 9,960,724 B2
(45) Date of Patent: May 1, 2018

(54) DRIVING SYSTEM FOR HYBRID ELECTRIC VEHICLES AND METHOD OF CONTROLLING PHASE OF PULSE WIDTH MODULATION CARRIER SIGNAL IN THE SAME

(71) Applicant: HYUNDAI MOBIS Co., Ltd., Seoul (KR)

(72) Inventor: Sang Min Kim, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 194 days.

(21) Appl. No.: 14/887,710

(22) Filed: Oct. 20, 2015

(65) Prior Publication Data

US 2016/0118925 A1    Apr. 28, 2016

(30) Foreign Application Priority Data

Oct. 23, 2014    (KR) .................. 10-2014-0144215

(51) Int. Cl.
*H02P 1/00*    (2006.01)
*H02P 27/08*    (2006.01)
(Continued)

(52) U.S. Cl.
CPC ............... *H02P 27/08* (2013.01); *B60L 7/14* (2013.01); *B60L 11/123* (2013.01); *B60L 15/08* (2013.01); *B60L 15/20* (2013.01); *B60L 15/2009* (2013.01); *B60W 20/00* (2013.01); *H02P 3/14* (2013.01); *H02P 5/74* (2013.01); *B60L 2210/14* (2013.01); *B60L 2210/20* (2013.01); *B60L 2210/30* (2013.01); *B60L 2210/40* (2013.01); *B60L 2240/429* (2013.01); *B60L 2240/526* (2013.01); *B60L 2240/529* (2013.01); *B60R 16/03* (2013.01); *Y02T 10/6217* (2013.01);
(Continued)

(58) Field of Classification Search
CPC ..... B60L 11/1803; H02M 1/10; H02M 7/493; H02M 2001/007; H02M 2003/1586; H02M 2001/0012; Y02T 10/7005
USPC .......................................... 318/139
See application file for complete search history.

(56) References Cited

U.S. PATENT DOCUMENTS

| | | | | |
|---|---|---|---|---|
| 4,047,083 A | * | 9/1977 | Plunkett ................ | H02M 7/483 318/807 |
| 2004/0160201 A1 | * | 8/2004 | Rahman .................. | H02P 23/06 318/41 |
| 2006/0119297 A1 | * | 6/2006 | Okamura .......... | H02M 7/53875 318/17 |

(Continued)

*Primary Examiner* — Bentsu Ro
*Assistant Examiner* — Gabriel Agared
(74) *Attorney, Agent, or Firm* — NSIP Law (57) ABSTRACT

A driving system for hybrid electric vehicles includes a DC/DC converter configured to convert low-voltage DC power of a vehicle battery into high-voltage DC power according to a first PWM signal generated based on a first PWM carrier signal; a first inverter configured to convert the high-voltage DC power into first AC power according to a second signal generated based on a second PWM carrier signal, and drive a first driving motor according to the first AC power; a second inverter configured to convert the high-voltage DC power into second AC power according to a third PWM signal generated based on a third PWM carrier signal, and drive a second driving motor according to the second AC power; and a PWM phase controller configured to separately control phases of the first to third PWM carrier signals according to an operation mode of each of the first and second driving motors.

20 Claims, 7 Drawing Sheets

(51) Int. Cl.
*B60W 20/00* (2016.01)
*B60L 15/20* (2006.01)
*H02P 3/14* (2006.01)
*B60L 7/14* (2006.01)
*B60L 11/12* (2006.01)
*B60L 15/08* (2006.01)
*H02P 5/74* (2006.01)
*B60R 16/03* (2006.01)

(52) U.S. Cl.
CPC ............ *Y02T 10/644* (2013.01); *Y02T 10/645* (2013.01); *Y02T 10/648* (2013.01); *Y02T 10/7005* (2013.01); *Y02T 10/7022* (2013.01); *Y02T 10/7077* (2013.01); *Y02T 10/725* (2013.01); *Y02T 10/7225* (2013.01); *Y02T 10/7241* (2013.01); *Y02T 10/7275* (2013.01); *Y10S 903/906* (2013.01)

(56) References Cited

U.S. PATENT DOCUMENTS

| | | | | |
|---|---|---|---|---|
| 2007/0278986 | A1* | 12/2007 | Okamura | B60K 6/365 318/798 |
| 2009/0066277 | A1* | 3/2009 | Ang | B60L 11/1803 318/400.17 |
| 2009/0251000 | A1* | 10/2009 | Su | B60L 11/1887 307/9.1 |
| 2013/0033914 | A1* | 2/2013 | Yahata | H02M 7/48 363/132 |
| 2013/0082628 | A1* | 4/2013 | Takegami | H02P 27/06 318/139 |

* cited by examiner

$\Phi_{HDC\_CAR}$ : PHASE OF PWM CARRIER FOR HDC SWITCHING
$\Phi_{INV1\_CAR}$ : PHASE OF PWM CARRIER FOR INV1 SWITCHING
$\Phi_{IVN2\_CAR}$ : PHASE OF PWM CARRIER FOR INV2 SWITCHING

FIG. 7

DRIVING SYSTEM FOR HYBRID ELECTRIC VEHICLES AND METHOD OF CONTROLLING PHASE OF PULSE WIDTH MODULATION CARRIER SIGNAL IN THE SAME

CROSS-REFERENCE TO RELATED APPLICATIONS

This application claims priority under 35 U.S.C. § 119 to Korean Patent Application No. 10-2014-0144215, filed on Oct. 23, 2014, the disclosure of which is incorporated herein by reference in its entirety.

TECHNICAL FIELD

The present invention relates to a driving system for hybrid electric vehicles and a Pulse Width Modulation (PWM) phase control method thereof, and more particularly, to a driving system for hybrid electric vehicles and a PWM phase control method thereof, which control a phase of a PWM carrier signal.

BACKGROUND

Figure 1:
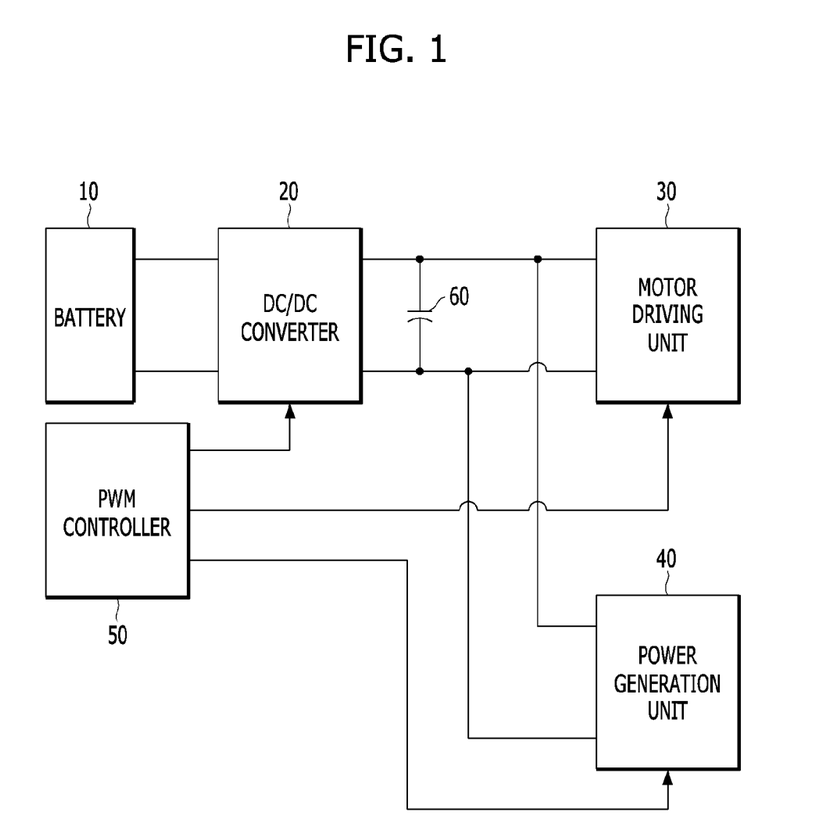
FIG. 1 is a block diagram illustrating a related art system for driving a hybrid electric vehicle.

FIG. 1 is a block diagram illustrating a related art driving system for hybrid electric vehicles.

Referring to FIG. 1, the related art driving system for hybrid electric vehicles includes a battery 10, a DC/DC converter 20, a motor driving unit 30, a power generation unit 40, a PWM controller 50, and a direct current (DC) voltage smoothing capacitor 60.

The battery 10 is a power supply source for supplying a low-level DC voltage.

The DC/DC converter 20 is an element that converts the low-voltage DC power into high-voltage DC power. Since the DC/DC converter 20 converts the low-voltage power into the high-voltage power, the DC/DC converter 20 may be referred to as a high voltage DC/DC converter (HDC).

The motor driving unit 30 includes an inverter that converts the high-voltage DC power, supplied from the DC/DC converter 20, into alternating current (AC) power and a driving motor that is driven with the AC power.

The driving motor included in motor driving unit 30 operates in a motoring mode for driving a vehicle and operates in a regenerative mode for collecting kinetic energy of a vehicle as electric energy.

The power generation unit 40 includes an inverter that converts the high-voltage DC power, supplied from the DC/DC converter 20, into the AC power and a driving motor that is driven with the AC power.

Unlike the driving motor included in the motor driving unit 30, the driving motor included in the power generation unit 40 may mainly operate in the regenerative mode, but may operate in the motoring mode.

The DC voltage smoothing capacitor 60 stabilizes (smooths) the high-voltage DC power supplied from the DC/DC converter 20.

A voltage output from each of the DC/DC converter 20 and the inverters is controlled according to a PWM signal generated by the PWM controller 50.

A duty ratio of the PWM signal is controlled based on a comparison result between a reference signal and a PWM carrier signal. Here, the PWM carrier signal may be a sawtooth-wave signal or a triangle-wave signal.

In the related art driving system for hybrid electric vehicles, PWM carrier signals applied to the DC/DC converter 20 and the inverters have the same phase.

In a method of controlling a phase of a carrier signal, when the driving motor of the motor driving unit 30 and the driving motor of the power generation unit 40 operates in the same operation mode (for example, the motoring mode or the regenerative mode), a ripple component of a current which flows in the DC voltage smoothing capacitor 60 according to an operation of the inverter of the motor driving unit 30 and a ripple component of a current which flows in the DC voltage smoothing capacitor 60 according to an operation of the inverter of the power generation unit 40 is summated, and for this reason, the ripple component of the current flowing in the DC voltage smoothing capacitor 60 increases. The increased rippled component of the current shortens a lifetime of the DC voltage smoothing capacitor 60.

Moreover, a size (or a capacitance) of the DC voltage smoothing capacitor 60 is designed in proportion to the ripple component of the current. Therefore, when the ripple component of the current increases, the size (or the capacitance) of the DC voltage smoothing capacitor 60 increases.

As described above, the reason that the ripple component of the current flowing in the DC voltage smoothing capacitor 60 increases is because the PWM carrier signals applied to the DC/DC converter 20 and the inverters have the same phase irrespective of an operation mode of each of the driving motors.

Therefore, if the PWM carrier signals applied to the DC/DC converter 20 and the inverters are controlled to have different phases according to the operation modes of the driving motors, the ripple component of the current flowing in the DC voltage smoothing capacitor 60 can be reduced.

However, a system for separately controlling the phases of the PWM carrier signals applied to the DC/DC converter 20 and the inverters according to the operation modes of the driving motors is not yet developed.

SUMMARY

Accordingly, the present invention provides a driving system for hybrid electric vehicles and a PWM phase control method thereof, which separately control phases of PWM carrier signals applied to a DC/DC converter and a plurality of inverters.

In one general aspect, a driving system for hybrid electric vehicles includes: a DC/DC converter configured to convert low-voltage direct current (DC) power of a vehicle battery into high-voltage DC power according to a first pulse width modulation (PWM) signal generated based on a first PWM carrier signal; a first inverter configured to convert the high-voltage DC power into first alternating current (AC) power according to a second PWM signal generated based on a second PWM carrier signal, and drive a first driving motor, which operates in one mode of a motoring mode for driving a vehicle and a regenerative mode for collecting kinetic energy of the vehicle as electric energy, according to the first AC power; a second inverter configured to convert the high-voltage DC power into second AC power according to a third PWM signal generated based on a third PWM carrier signal, and drive a second driving motor, which operates in one mode of the motoring mode and the regenerative mode, according to the second AC power; and a PWM phase controller configured to separately control phases of the first to third PWM carrier signals according to an operation mode of each of the first and second driving motors.

In another general aspect, a method of controlling a phase of a pulse width modulation (PWM) carrier signal in a driving system for hybrid electric vehicles includes: converting, by a DC/DC converter, low-voltage direct current (DC) power of a vehicle battery into high-voltage DC power according to a first PWM signal generated based on a first PWM carrier signal; converting, by a first inverter, the high-voltage DC power into first alternating current (AC) power according to a second PWM signal generated based on a second PWM carrier signal, and driving a first driving motor, which operates in one mode of a motoring mode for driving a vehicle and a regenerative mode for collecting kinetic energy of the vehicle as electric energy, according to the first AC power; converting, by a second inverter, the high-voltage DC power into second AC power according to a third PWM signal generated based on a third PWM carrier signal, and driving a second driving motor, which operates in one mode of the motoring mode and the regenerative mode, according to the second AC power; and separately controlling, by a PWM phase controller, phases of the first to third PWM carrier signals according to an operation mode of each of the first and second driving motors.

Other features and aspects will be apparent from the following detailed description, the drawings, and the claims.

DETAILED DESCRIPTION OF EMBODIMENTS

The present invention separately controls phases of PWM carrier signals respectively applied to a high voltage DC/DC converter (HDC), a first inverter, and a second inverter according to an operation mode (for example, a motoring mode, a regenerative mode, or the same operation mode) of each of first and second driving motors, for decreasing a ripple component of a current flowing in a DC voltage smoothing capacitor forming a DC-link in a driving system for hybrid electric vehicles.

Accordingly, a size (or a capacitance) of the DC voltage smoothing capacitor forming the DC-link in the driving system for hybrid electric vehicles is reduced.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 2:
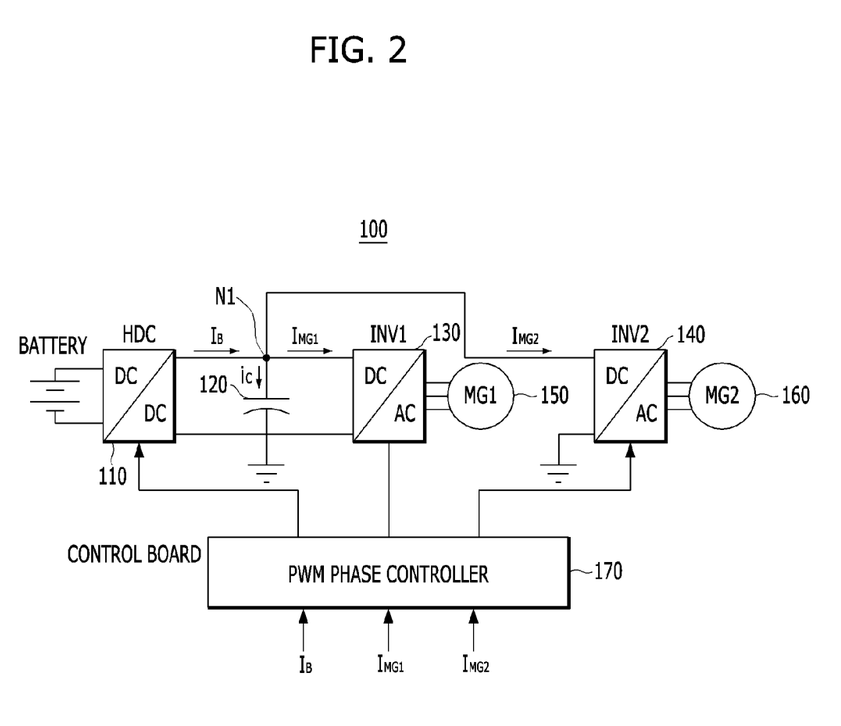
FIG. 2 is a block diagram of a driving system for hybrid electric vehicles according to an embodiment of the present invention.

FIG. 2 is a block diagram of a driving system 100 for hybrid electric vehicles according to an embodiment of the present invention.

Referring to FIG. 2, the driving system 100 for hybrid electric vehicles according to an embodiment of the present invention may include a DC/DC converter 110, a DC voltage smoothing capacitor 120, a first inverter (INV1) 130, a second inverter (INV2) 140, a first driving motor (MG1) 150, a second driving motor (MG2) 160, and a PWM phase controller 170.

The DC/DC converter (a high voltage DC/DC converter (HDC)) 110 may convert low-voltage DC power into high-voltage DC power or may convert the high-voltage DC power into the low-voltage DC power according to a discharging mode or a charging mode of a vehicle battery. For example, the DC/DC converter 110 may convert the low-voltage DC power into the high-voltage DC power in the discharging mode of the vehicle battery, and in the charging mode of the vehicle battery, the DC/DC converter 110 may convert the high-voltage DC power into the low-voltage DC power.

The DC/DC converter 110 may perform a voltage modulation operation in a PWM scheme according to a first PWM carrier signal having a phase which has been controlled according to a phase control method to be described below.

The DC voltage smoothing capacitor 120 may stabilize (smooth) the high-voltage DC power (or a high-level DC current $I_B$) generated through conversion by the HDC 110.

The first inverter (INV1) 130 may convert the high-voltage DC power, which has been smoothed by the DC voltage smoothing capacitor 120 according to an operation mode of the first driving motor 150, into first AC power or may convert the first AC power into the high-voltage DC power in the PWM scheme using a second PWM carrier signal having a phase which has been controlled according to the below-described phase control method.

For example, when the first driving motor 150 operates in a motoring mode for driving a vehicle, the first inverter (INV1) 130 may convert the smoothed high-voltage DC power into the first AC power. When the first driving motor (MG1) 150 operates in a regenerative mode for collecting kinetic energy of the vehicle as electric energy, the first inverter (INV1) 130 may convert the first AC power into the high-voltage DC power.

The second inverter (INV2) 140 may convert the high-voltage DC power, which has been smoothed by the DC voltage smoothing capacitor 120 according to an operation mode of the second driving motor (MG2) 160, into second AC power or may convert the second AC power into the high-voltage DC power in the PWM scheme using a second PWM carrier signal having a phase which has been controlled according to the below-described phase control method.

For example, when the second driving motor 160 operates in the motoring mode, the second inverter (INV2) 140 may convert the smoothed high-voltage DC power into the second AC power. When the second driving motor 160 operates in the regenerative mode, the second inverter (INV2) 140 may convert the second AC power into the high-voltage DC power.

The first driving motor 150 may operate in one of the motoring mode and the regenerative mode and may be driven with the first AC power output from the first inverter 130.

The second driving motor 160 may operate in one of the motoring mode and the regenerative mode and may be driven with the second AC power output from the second inverter 140.

The PWM phase controller 170 may separately control phases of the first to third PWM carrier signals according to the operation mode of each of the first and second driving motors 150 and 160.

Moreover, the PWM phase controller 170 may generate the first to third PWM carrier signals respectively having phases which have been controlled by the phase control method according to an embodiment of the present invention, and may respectively apply first to third PWM signals to the DC/DC converter 110, the first inverter 130, and the second inverter 140, based on the generated first to third PWM carrier signals.

The DC/DC converter 110, the first inverter 130, and second inverter 140 may perform a voltage modulation operation according to the phase-controlled first to third PWM signals according to an embodiment of the present invention, thereby decreasing a ripple component of a current flowing in the DC voltage smoothing capacitor 120.

Figure 3:
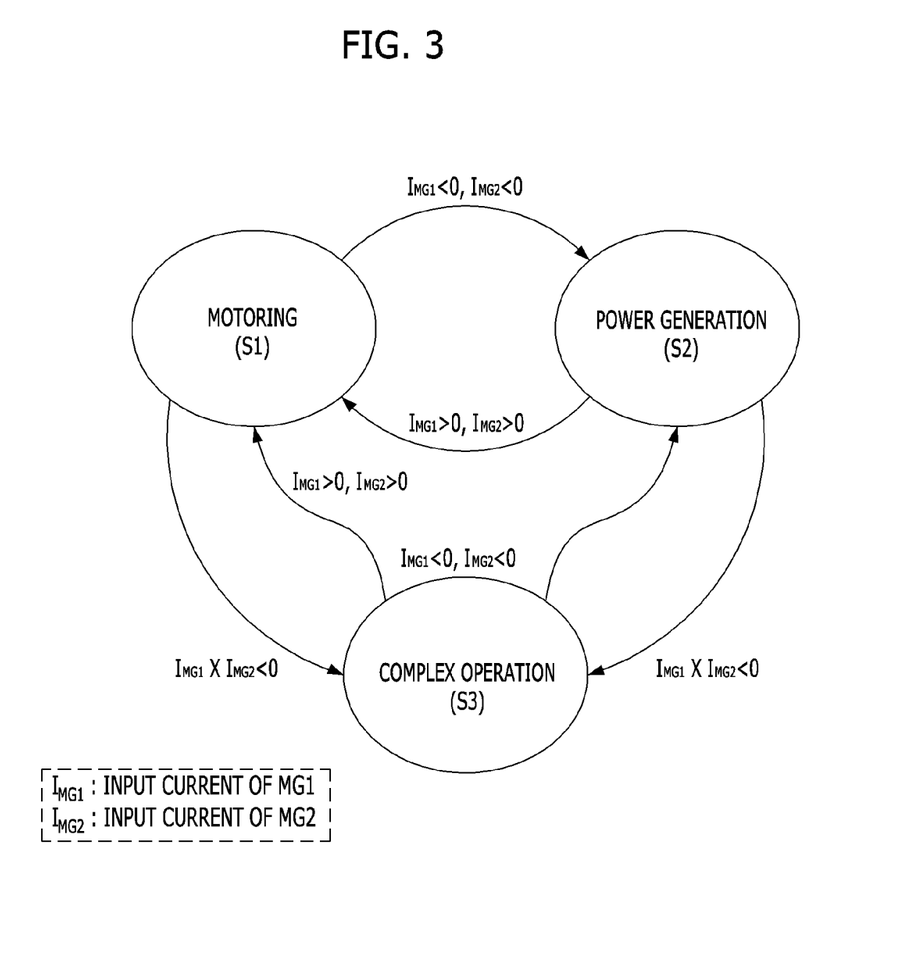
FIG. 3 is a state diagram illustrating an operation state of the driving system for hybrid electric vehicles illustrated in FIG. 2.

FIG. 3 is a state diagram illustrating an operation state of the driving system 100 for hybrid electric vehicles illustrated in FIG. 2.

Referring to FIG. 3, the operation state of the driving system 100 for hybrid electric vehicles according to an embodiment of the present invention may include a motoring operation state S1, a regenerative operation state S2, and a complex operation state S3.

In FIG. 3, reference numeral "$I_{MG1}$" refers to an input current (hereinafter referred to as a first input current) which is input to an input terminal of the first inverter 130 via the DC voltage smoothing capacitor 120, and reference numeral "$I_{MG2}$" refers to an input current (hereinafter referred to as a second input current) which is input to an input terminal of the second inverter 140 via the DC voltage smoothing capacitor 120.

The motoring operation state S1 defines a state where all the first and second driving motors 150 and 160 operate in the motoring mode. When the first and second input currents $I_{MG1}$ and $I_{MG2}$ have a value less than 0, the motoring operation state S1 may be switched to the regenerative operation state S2. When a value "$I_{MG1} \times I_{MG2}$" obtained by multiplying a level of the first input current $I_{MG1}$ and a level of the second input current $I_{MG2}$ is less than 0, the motoring operation state S1 may be switched to the complex operation state S3.

The regenerative operation state S2 defines a state where all the first and second driving motors 150 and 160 operate in the regenerative mode. When the first and second input currents $I_{MG1}$ and $I_{MG2}$ have a value greater than 0, the regenerative operation state S2 may be switched to the motoring operation state S1. When the value "$I_{MG1} \times I_{MG2}$" obtained by multiplying the level of the first input current $I_{MG1}$ and the level of the second input current $I_{MG2}$ is less than 0, the regenerative operation state S2 may be switched to the complex operation state S3.

The complex operation state S3 defines a state where the first and second driving motors 150 and 160 operate in different operation modes. For example, the complex operation state S3 defines a state where the first driving motor 150 operates in the motoring mode and the second driving motor 160 operates in the regenerative mode, or defines a state where the first driving motor 150 operates in the regenerative mode and the second driving motor 160 operates in the motoring mode.

When the first and second input currents $I_{MG1}$ and $I_{MG2}$ have a value less than 0, the complex operation state S3 may be switched to the regenerative operation state S2. When the first and second input currents $I_{MG1}$ and $I_{MG2}$ have a value greater than 0, the complex operation state S3 may be switched to the motoring operation state S1.

Hereinafter, a method of controlling a phase of a PWM carrier signal for reducing a ripple component of a current flowing in the DC voltage smoothing capacitor according to a driving state of a vehicle will be described in detail with reference to FIGS. 4 to 7.

Figure 4:
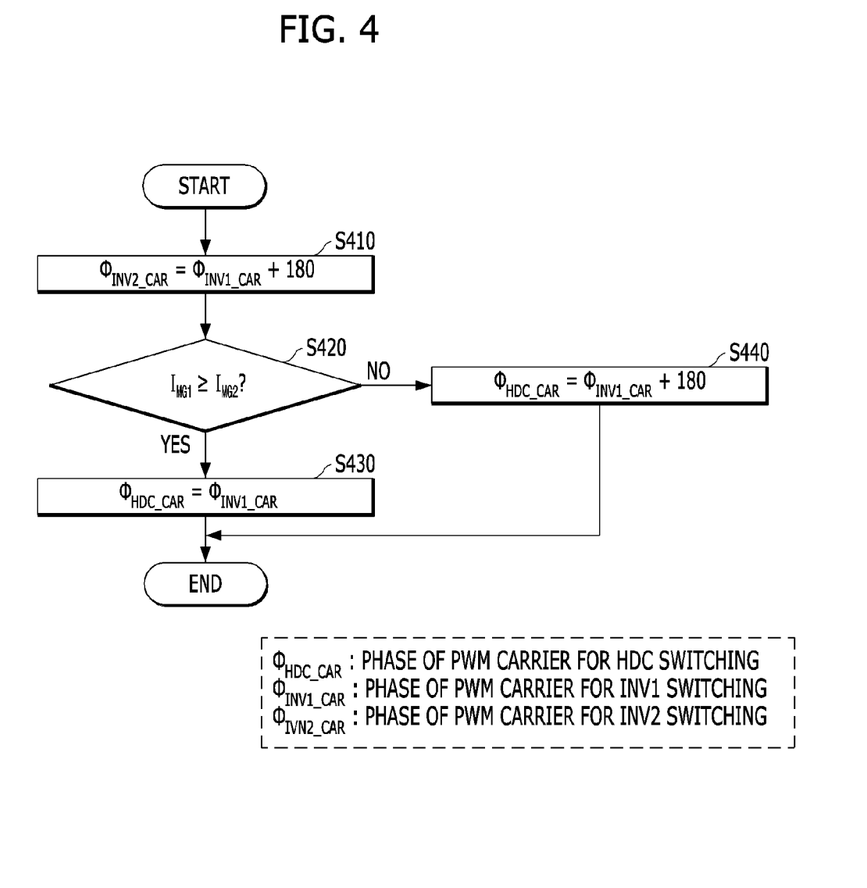
FIG. 4 is a flowchart for describing a method of controlling a phase of a PWM carrier signal when first and second driving motors illustrated in FIG. 2 all operate in a motoring mode.

FIG. 4 is a flowchart for describing a method of controlling a phase of a PWM carrier signal when first and second driving motors illustrated in FIG. 2 all operate in a motoring mode.

Referring to FIG. 4, first, the PWM phase controller 170 may receive the first and second input currents $I_{MG1}$ and $I_{MG2}$ to determine an operation mode of each of the first and second driving motors 150 and 160, based on a state switching condition described above with reference to FIG. 3.

When all the first and second driving motors 150 and 160 operate in the motoring mode as a result of the operation-mode determination (or when a vehicle battery is in a discharging state), the PWM phase controller 170 may control a phase of the third PWM carrier signal "$\Phi_{INV2\_CAR}$" applied to the second inverter 140 for applying the third PWM carrier signal "$\Phi_{INV2\_CAR}$", having a 180-degree phase difference with respect to a phase of the second PWM carrier signal "$\Phi_{INV1\_CAR}$" applied to the first inverter 130, to the second inverter 140 in step S410 ($\Phi_{INV2\_CAR} = \Phi_{INV1\_CAR} + 180$).

Subsequently, in step S420, the PWM phase controller 170 may compare the first and second input currents $I_{MG1}$ and $I_{MG2}$ distributed from a node N1 connected to an anode of the DC voltage smoothing capacitor 120 of FIG. 3.

Subsequently, when the first input current $I_{MG1}$ is equal to or higher than the second input current $I_{MG2}$ as a result of the comparison in step S420 ($I_{MG1} \geq I_{MG2}$), the PWM phase controller 170 may control a phase of the first PWM carrier signal "$\Phi_{HDC\_CAR}$" applied to the DC/DC converter 110 for applying the first PWM carrier signal "$\Phi_{HDC\_CAR}$", having the same phase as a phase of the second PWM carrier signal "$\Phi_{INV1\_CAR}$" applied to the first inverter 130, to the DC/DC converter 110 in step S430 ($\Phi_{HDC\_CAR}=\Phi_{INV1\_CAR}$).

For example, when the first input current $I_{MG1}$ is lower than the second input current $I_{MG2}$ as the result of the comparison in step S420 ($I_{MG1}<I_{MG2}$), the PWM phase controller 170 may control a phase of the first PWM carrier signal "$\Phi_{HDC\_CAR}$" for applying the first PWM carrier signal "$\Phi_{HDC\_CAR}$", having a 180-degree phase difference with respect to a phase of the second PWM carrier signal "$\Phi_{INV1\_CAR}$" applied to the first inverter 130, to the DC/DC converter 110 in step S440.

As a result, in the method of controlling a phase of a PWM carrier signal, when all the first and second driving motors 150 and 160 operate in the motoring mode, a phase of the first PWM carrier signal "$\Phi_{HDC\_CAR}$" applied to the DC/DC converter (the HDC) 110 may be controlled to be synchronized with a phase of a PWM carrier signal applied to an inverter to which an input current having a high value among the first and second input currents $I_{MG1}$ and $I_{MG2}$ respectively input to the first and second inverters 130 and 140 is input.

Figure 5:
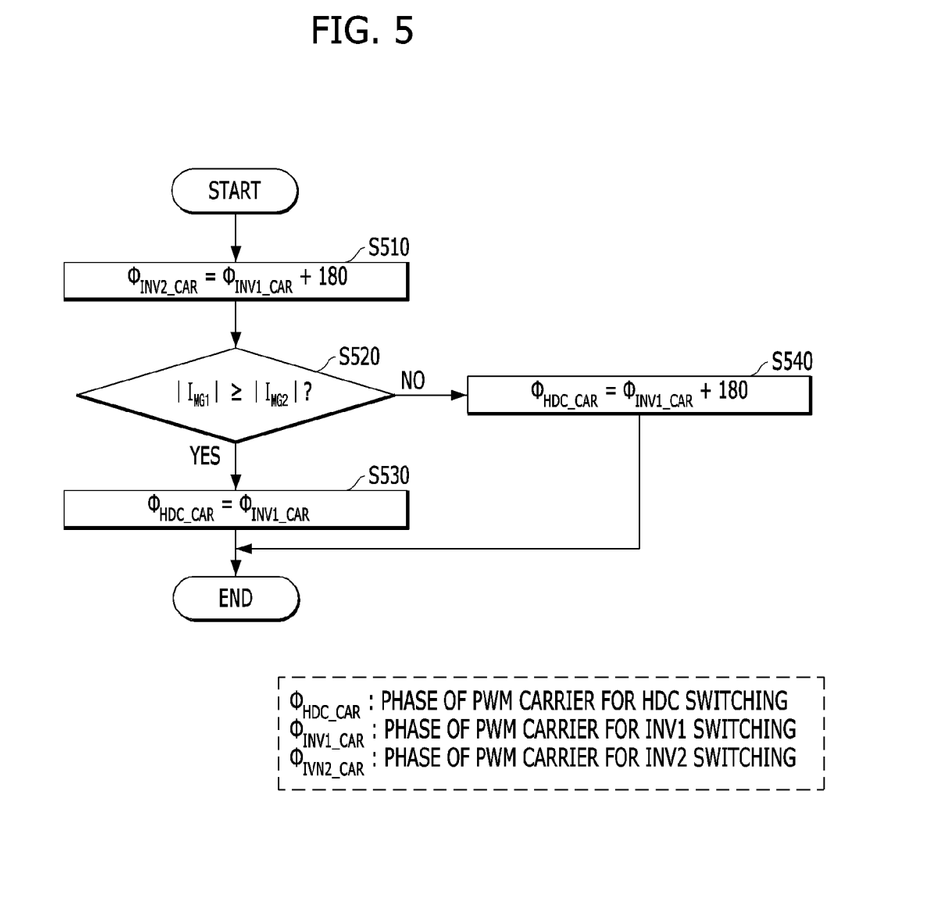
FIG. 5 is a flowchart for describing a method of controlling a phase of a PWM carrier signal when the first and second driving motors illustrated in FIG. 2 all operate in a regenerative mode.

FIG. 5 is a flowchart for describing a method of controlling a phase of a PWM carrier signal when the first and second driving motors illustrated in FIG. 2 all operate in a regenerative mode.

Referring to FIG. 5, first, the PWM phase controller 170 may receive the first and second input currents $I_{MG1}$ and $I_{MG2}$ to determine an operation mode of each of the first and second driving motors 150 and 160, based on the state switching condition described above with reference to FIG. 3.

When all the first and second driving motors 150 and 160 operate in the regenerative mode as a result of the operation-mode determination (or when the vehicle battery is in a charging state), the PWM phase controller 170 may control a phase of the third PWM carrier signal "$\Phi_{INV2\_CAR}$" for applying the third PWM carrier signal "$\Phi_{INV2\_CAR}$", having a 180-degree phase difference with respect to a phase of the second PWM carrier signal "$\Phi_{INV1\_CAR}$" applied to the first inverter 130, to the second inverter 140 in step S510 ($\Phi_{INV1\_CAR}=\Phi_{INV1\_CAR}+180$).

Subsequently, in step S520, the PWM phase controller 170 may compare the first and second input currents $I_{MG1}$ and $I_{MG2}$. In this case, when all the first and second driving motors 150 and 160 operate in the regenerative mode, the vehicle battery may be in the charging state, and thus, directions of the first and second input currents $I_{MG1}$ and $I_{MG2}$ of FIG. 4 may be opposite to those of the first and second input currents $I_{MG1}$ and $I_{MG2}$ of FIG. 5. Therefore, each of the first and second input currents $I_{MG1}$ and $I_{MG2}$ of FIG. 5 may be expressed as a negative value, and in this case, the PWM phase controller 170 may compare an absolute value "$|I_{MG1}|$" of a level of the first input current $I_{MG1}$ with an absolute value "$|I_{MG2}|$" of a level of the second input current $I_{MG2}$.

Subsequently, when the absolute value "$|I_{MG1}|$" of the first input current $I_{MG1}$ is equal to or greater than the absolute value "$|I_{MG2}|$" of the second input current $I_{MG2}$ as a result of the comparison in step S520 ($|I_{MG1}|\geq|I_{MG2}|$), the PWM phase controller 170 may control a phase of the first PWM carrier signal "$\Phi_{HDC\_CAR}$" applied to the DC/DC converter 110 for applying the first PWM carrier signal "$\Phi_{HDC\_CAR}$", having the same phase as a phase of the second PWM carrier signal "$\Phi_{INV1\_CAR}$" applied to the first inverter 130, to the DC/DC converter 110 in step S530 ($\Phi_{HDC\_CAR}=\Phi_{INV1\_CAR}$).

For example, when the absolute value "$|I_{MG1}|$" of the first input current $I_{MG1}$ is less than the absolute value "$|I_{MG2}|$" of the second input current $I_{MG2}$ as the result of the comparison in step S520, the PWM phase controller 170 may control a phase of the first PWM carrier signal "$\Phi_{HDC\_CAR}$" for applying the first PWM carrier signal "$\Phi_{HDC\_CAR}$", having a 180-degree phase difference with respect to a phase of the second PWM carrier signal "$\Phi_{INV1\_CAR}$", to the DC/DC converter 110 in step S540.

As a result, in the method of controlling a phase of a PWM carrier signal, when all the first and second driving motors 150 and 160 operate in the regenerative mode, a phase of the first PWM carrier signal "$\Phi_{HDC\_CAR}$" applied to the DC/DC converter (the HDC) 110 may be controlled to be synchronized with a phase of a PWM carrier signal applied to an inverter to which an input current having a high absolute value among the first and second input currents $I_{MG1}$ and $I_{MG2}$ respectively input to the first and second inverters 130 and 140 is input.

Figure 6:
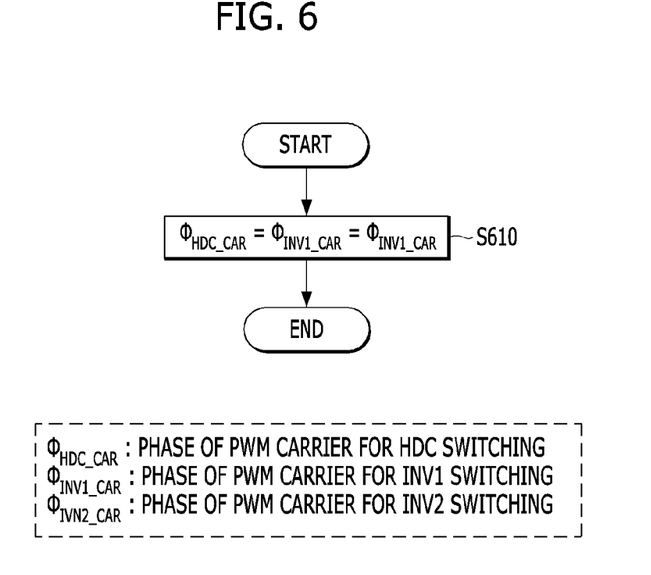
FIG. 6 is a flowchart for describing a method of controlling a phase of a PWM carrier signal when the first and second driving motors illustrated in FIG. 2 all operate in a regenerative mode.

FIG. 6 is a flowchart for describing a method of controlling a phase of a PWM carrier signal when the first and second driving motors illustrated in FIG. 2 all operate in a regenerative mode.

Referring to FIG. 6, first, the PWM phase controller 170 may receive the first and second input currents $I_{MG1}$ and $I_{MG2}$ to determine an operation mode of each of the first and second driving motors 150 and 160, based on the state switching condition described above with reference to FIG. 3. When it is determined that the first and second driving motors 150 and 160 operate in different operation modes, the first to third PWM carrier signals respectively applied to the DC/DC converter 110, the first inverter 130, and the second inverter 140 may be controlled to have the same phase in operation S610.

Figure 7:
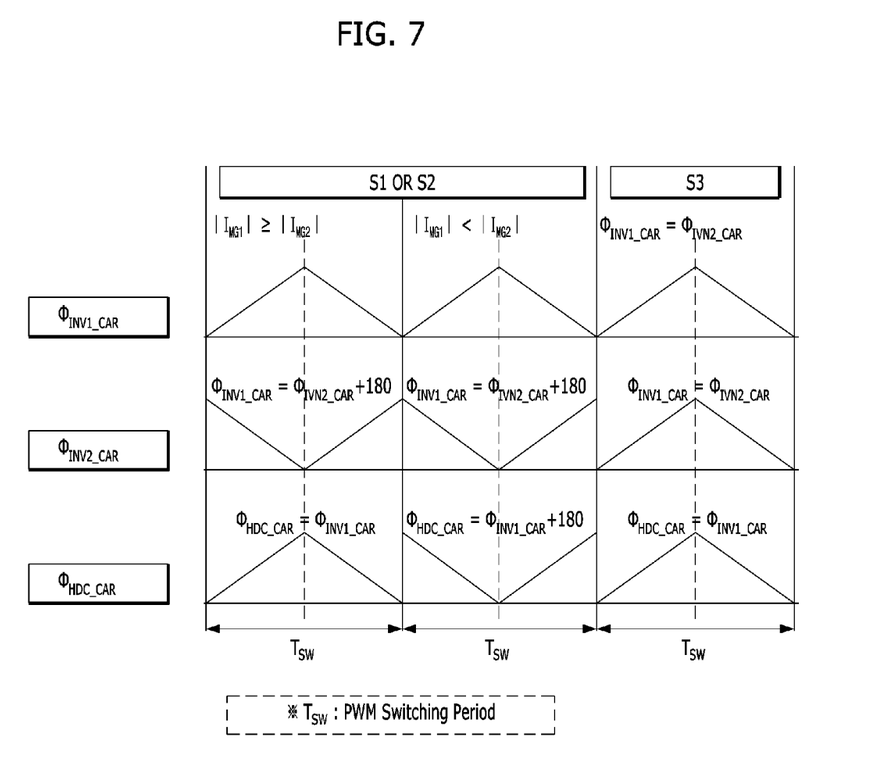
FIG. 7 is a diagram showing waveforms of first to third PWM carrier signals for generating first to third PWM signals respectively applied to the DC/DC converter, a first inverter, and a second inverter according to operation modes of the first and second driving motors illustrated in FIG. 2.

FIG. 7 is a diagram showing waveforms of first to third PWM carrier signals for generating the first to third PWM signals respectively applied to the DC/DC converter 110, the first inverter 130, and the second inverter 140 according to operation modes of the first and second driving motors illustrated in FIG. 2.

As shown in FIG. 7, in a state S3 where the first and second driving motors 150 and 160 operate in different operation modes, all the PWM carrier signals may be phase-controlled to have the same phase in one PWM switching period $T_{SW}$. In a state S1 or S2 where the first and second driving motors 150 and 160 operate in the same operation mode (for example, the motoring mode or the regenerative mode), a 180-degree phase difference may occur between a phase of a PWM carrier signal applied to the first inverter 130 and a phase of a PWM carrier signal applied to the second inverter 140.

When the first and second driving motors 150 and 160 operate in the same operation mode (for example, the motoring mode or the regenerative mode) and a level of an input current input to the first driving motor 150 is lower than that of an input current input to the second driving motor 160, a 180-degree phase difference may occur between a phase of a PWM carrier signal applied to the DC/DC converter (the HDC) 110 and a phase of a PWM carrier signal applied to the first inverter 130.

According to the embodiments of the present invention, the rippled component of the current flowing in the DC voltage smoothing capacitor forming a DC link is reduced by separately controlling the PWM carrier signals respectively applied to the HDC and the first and second inverters according to the operation mode (for example, the motoring mode, the regenerative mode, or the same operation mode)

of each of the first and second driving motors, thereby decreasing a size (or a capacitance) of the DC voltage smoothing capacitor.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A driving system for hybrid electric vehicles, the driving system comprising:
    a DC/DC converter configured to convert low-voltage direct current (DC) power of a vehicle battery into high-voltage DC power according to a first pulse width modulation (PWM) signal generated based on a first PWM carrier signal;
    a first inverter configured to convert the high-voltage DC power into first alternating current (AC) power according to a second PWM signal generated based on a second PWM carrier signal, and drive a first driving motor, wherein the first driving motor is configured to operate in either one of a motoring mode for driving a vehicle and a regenerative mode for collecting kinetic energy of the vehicle as electric energy, according to the first AC power;
    a second inverter configured to convert the high-voltage DC power into second AC power according to a third PWM signal generated based on a third PWM carrier signal, and drive a second driving motor, wherein the second driving motor is configured to operate in either one of the motoring mode and the regenerative mode, according to the second AC power; and
    a PWM phase controller configured to:
        separately control phases of the first to third PWM carrier signals according to an operation mode of each of the first and second driving motors, and
        control, when the first and second driving motors operate in the motoring mode or when the first and second driving motors operate in the regenerative mode, the phase of the first PWM carrier signal to have the same phase as the phase of the second PWM carrier signal.

2. The driving system of claim 1, wherein the PWM phase controller is configured to control, when the first and second driving motors operate in the motoring mode, the phase of the first PWM carrier signal to have the same phase as the phase of the second PWM carrier signal.

3. A driving system for hybrid electric vehicles, the driving system comprising:
    a DC/DC converter configured to convert low-voltage direct current (DC) power of a vehicle battery into high-voltage DC power according to a first pulse width modulation (PWM) signal generated based on a first PWM carrier signal;
    a first inverter configured to convert the high-voltage DC power into first alternating current (AC) power according to a second PWM signal generated based on a second PWM carrier signal, and drive a first driving motor, which operates in one mode of a motoring mode for driving a vehicle and a regenerative mode for collecting kinetic energy of the vehicle as electric energy, according to the first AC power;
    a second inverter configured to convert the high-voltage DC power into second AC power according to a third PWM signal generated based on a third PWM carrier signal, and drive a second driving motor, which operates in one mode of the motoring mode and the regenerative mode, according to the second AC power;
    a PWM phase controller configured to separately control phases of the first to third PWM carrier signals according to an operation mode of each of the first and second driving motors, wherein when all the first and second driving motors operate in the motoring mode, the PWM phase controller controls the phase of the first PWM carrier signal to have the same phase as the phase of the second PWM carrier signal; and
    a DC voltage smoothing capacitor configured to connect an output terminal of the DC/DC converter to an input terminal of each of the first and second inverters,
        wherein a level of a first input current which is input to the input terminal of the first inverter via the DC voltage smoothing capacitor is higher than a level of a second input current which is input to the input terminal of the second inverter via the DC voltage smoothing capacitor.

4. The driving system of claim 1, wherein the PWM phase controller is configured to control, when the first and second driving motors operate in the motoring mode, the phase of the first PWM carrier signal to have a 180-degree phase difference with respect to the phase of the second PWM carrier signal.

5. The driving system of claim 4, further comprising: a DC voltage smoothing capacitor configured to connect an output terminal of the DC/DC converter to an input terminal of each of the first and second inverters,
    wherein a level of a first input current which is input to the input terminal of the first inverter via the DC voltage smoothing capacitor is lower than a level of a second input current which is input to the input terminal of the second inverter via the DC voltage smoothing capacitor.

6. The driving system of claim 1, wherein the PWM phase controller is configured to control, when all the first and second driving motors operate in the regenerative mode, the phase of the first PWM carrier signal to have the same phase as the phase of the second PWM carrier signal.

7. The driving system of claim 6, further comprising: a DC voltage smoothing capacitor configured to connect an output terminal of the DC/DC converter to an input terminal of each of the first and second inverters,
    wherein an absolute value of a first input current which is input to the input terminal of the first inverter via the DC voltage smoothing capacitor is greater than an absolute value of a second input current which is input to the input terminal of the second inverter via the DC voltage smoothing capacitor.

8. The driving system of claim 1, wherein the PWM phase controller is configured to control, when the first and second driving motors operate in the regenerative mode, the phase of the first PWM carrier signal to have a 180-degree phase difference with respect to the phase of the second PWM carrier signal.

9. The driving system of claim 8, further comprising: a DC voltage smoothing capacitor configured to connect an output terminal of the DC/DC converter to an input terminal of each of the first and second inverters,
    wherein an absolute value of a first input current which is input to the input terminal of the first inverter via the DC voltage smoothing capacitor is less than an absolute value of a second input current which is input to the input terminal of the second inverter via the DC voltage smoothing capacitor.

10. The driving system of claim 1, wherein the PWM phase controller is configured to control, when the first and second driving motors operate in different operation modes, the first to third PWM carrier signals to have the same phase.

11. A method of controlling a phase of a pulse width modulation (PWM) carrier signal in a driving system for hybrid electric vehicles, the method comprising:
converting, by a DC/DC converter, low-voltage direct current (DC) power of a vehicle battery into high-voltage DC power according to a first PWM signal generated based on a first PWM carrier signal;
converting, by a first inverter, the high-voltage DC power into first alternating current (AC) power according to a second PWM signal generated based on a second PWM carrier signal, and driving a first driving motor, wherein the first driving motor is configured to operate in either one of a motoring mode for driving a vehicle and a regenerative mode for collecting kinetic energy of the vehicle as electric energy, according to the first AC power;
converting, by a second inverter, the high-voltage DC power into second AC power according to a third PWM signal generated based on a third PWM carrier signal, and driving a second driving motor, wherein the second driving motor is configured to operate in either one of the motoring mode and the regenerative mode, according to the second AC power; and
separately controlling, by a PWM phase controller, phases of the first to third PWM carrier signals according to an operation mode of each of the first and second driving motors,
wherein the controlling comprises controlling, when the first and second driving motors operate in the motoring mode or when the first and second driving motors operate in the regenerative mode, the phase of the first PWM carrier signal to have the same phase as the phase of the second PWM carrier signal.

12. The method of claim 11, wherein the controlling comprises controlling, when the first and second driving motors operate in the motoring mode, the phase of the first PWM carrier signal to have the same phase as the phase of the second PWM carrier signal.

13. The method of claim 12, wherein
the driving system comprises a DC voltage smoothing capacitor configured to connect an output terminal of the DC/DC converter to an input terminal of each of the first and second inverters
the controlling comprises:
comparing a level of a first input current, which is input to the input terminal of the first inverter via the DC voltage smoothing capacitor, with a level of a second input current which is input to the input terminal of the second inverter via the DC voltage smoothing capacitor; and
when the level of the first input current is higher than the level of the second input current, controlling the phase of the first PWM carrier signal to have the same phase as the phase of the second PWM carrier signal.

14. The method of claim 11 wherein the controlling comprises controlling, when the first and second driving motors operate in the motoring mode, the phase of the first PWM carrier signal to have a 180-degree phase difference with respect to the phase of the second PWM carrier signal.

15. The method of claim 14, wherein
the driving system comprises a DC voltage smoothing capacitor configured to connect an output terminal of the DC/DC converter to an input terminal of each of the first and second inverters
the controlling comprises:
comparing a level of a first input current, which is input to the input terminal of the first inverter via the DC voltage smoothing capacitor, with a level of a second input current which is input to the input terminal of the second inverter via the DC voltage smoothing capacitor; and
when the level of the first input current is lower than the level of the second input current, controlling the phase of the first PWM carrier signal to have a 180-degree phase difference with respect to the phase of the second PWM carrier signal.

16. The method of claim 11, wherein the controlling comprises controlling, when the first and second driving motors operate in the regenerative mode, the phase of the first PWM carrier signal to have the same phase as the phase of the second PWM carrier signal.

17. The method of claim 16, wherein
the driving system comprises a DC voltage smoothing capacitor configured to connect an output terminal of the DC/DC converter to an input terminal of each of the first and second inverters
the controlling comprises:
comparing an absolute value of a first input current, which is input to the input terminal of the first inverter via the DC voltage smoothing capacitor, with an absolute value of a second input current which is input to the input terminal of the second inverter via the DC voltage smoothing capacitor; and
when the absolute value of the first input current is greater than the absolute value of the second input current, controlling the phase of the first PWM carrier signal to have the same phase as the phase of the second PWM carrier signal.

18. The method of claim 11, wherein the controlling comprises controlling, when the first and second driving motors operate in the regenerative mode, the phase of the first PWM carrier signal to have a 180-degree phase difference with respect to the phase of the second PWM carrier signal.

19. The method of claim 18, wherein
the driving system comprises a DC voltage smoothing capacitor configured to connect an output terminal of the DC/DC converter to an input terminal of each of the first and second inverters
the controlling comprises:
comparing an absolute value of a first input current, which is input to the input terminal of the first inverter via the DC voltage smoothing capacitor, with an absolute value of a second input current which is input to the input terminal of the second inverter via the DC voltage smoothing capacitor; and
when the absolute value of the first input current is less than the absolute value of the second input current, controlling the phase of the first PWM carrier signal to have a 180-degree phase difference with respect to the phase of the second PWM carrier signal.

20. The method of claim 11, wherein the controlling comprises controlling, when the first and second driving motors operate in different operation modes, the first to third PWM carrier signals to have the same phase.

* * * * *